(12) United States Patent
Gregory et al.

(10) Patent No.: US 10,690,551 B2
(45) Date of Patent: Jun. 23, 2020

(54) TEMPERATURE AND THERMAL GRADIENT SENSOR FOR CERAMIC MATRIX COMPOSITES AND METHODS OF PREPARATION THEREOF

(71) Applicant: Rhode Island Board of Education, Kingston, RI (US)

(72) Inventors: Otto Gregory, Narragansett, RI (US); John Rhoat, Wakefield, RI (US); Kevin Rivera, Providence, RI (US); Tommy Muth, Providence, RI (US)

(73) Assignee: RHODE ISLAND COUNCIL ON POSTSECONDARY EDUCATION, Warwick, RI (US)

( * ) Notice: Subject to any disclaimer, the term of this patent is extended or adjusted under 35 U.S.C. 154(b) by 116 days.

(21) Appl. No.: 15/430,828

(22) Filed: Feb. 13, 2017

(65) Prior Publication Data

US 2017/0234739 A1  Aug. 17, 2017

Related U.S. Application Data

(60) Provisional application No. 62/294,851, filed on Feb. 12, 2016, provisional application No. 62/348,543, filed on Jun. 10, 2016.

(51) Int. Cl.
*G01K 7/08* (2006.01)
*C04B 35/78* (2006.01)
*G01K 7/02* (2006.01)

(52) U.S. Cl.
CPC .............. *G01K 7/08* (2013.01); *C04B 35/78* (2013.01); *G01K 7/028* (2013.01); *C04B 2235/3826* (2013.01); *C04B 2235/422* (2013.01); *C04B 2235/9607* (2013.01)

(58) Field of Classification Search
CPC .......... G01K 7/08; G01K 7/028; C04B 35/78; C04B 2235/3826; C04B 2235/422; C04B 2235/9607

See application file for complete search history.

(56) References Cited

U.S. PATENT DOCUMENTS

| 3,007,989 | A | * | 11/1961 | Nicholson | ............... G01K 7/06 136/228 |
| 4,056,395 | A | | 11/1977 | Sato et al. | |
| 4,225,569 | A | * | 9/1980 | Matsui | .................. C04B 35/524 264/29.1 |

(Continued)

OTHER PUBLICATIONS

"Revised Thermocouple Reference Tables: Type S, Omega Engineering, Stanford, CT", http://www.omega.com:80/temperature/Z/pdf/z208-209.pdf, 2001.

(Continued)

*Primary Examiner* — Lisa M Caputo
*Assistant Examiner* — Philip L Cotey
(74) *Attorney, Agent, or Firm* — Peacock Law P.C.; Philip D. Askenazy (57) ABSTRACT

The subject of the present invention relates to a device that can be applied to the surface of a ceramic matrix composites (CMC) in such a way that the CMC itself will contribute to the extraordinarily large thermoelectric power. The present invention obtains greater resolution of temperature measurements, which can be obtained at exceedingly high temperatures.

22 Claims, 8 Drawing Sheets

Schematic of surface temperature and thermal gradient sensors for CMCs

(56) References Cited

U.S. PATENT DOCUMENTS

| | | | |
|---|---|---|---|
| 4,450,314 A * | 5/1984 | Huther | G01K 7/06 |
| | | | 136/201 |
| 4,663,205 A | 5/1987 | Hayashi et al. | |
| 4,907,052 A | 3/1990 | Takada et al. | |
| 4,935,345 A | 6/1990 | Guilbeau et al. | |
| 5,474,618 A | 12/1995 | Allaire | |
| 5,523,957 A * | 6/1996 | Perron | G01K 1/146 |
| | | | 374/E1.02 |
| 5,804,277 A * | 9/1998 | Ashbee | B29C 70/24 |
| | | | 139/410 |
| 5,867,886 A | 2/1999 | Ratell et al. | |
| 6,299,988 B1 | 10/2001 | Wang et al. | |
| 6,325,608 B1 | 12/2001 | Shivakumar et al. | |
| 6,341,892 B1 | 1/2002 | Schmermund | |
| 6,437,681 B1 | 8/2002 | Wang et al. | |
| 7,498,066 B2 | 3/2009 | Kumar et al. | |
| 7,687,016 B1 | 3/2010 | Dicarlo et al. | |
| 7,741,834 B2 | 6/2010 | Dang | |
| 8,052,324 B2 | 11/2011 | Gregory et al. | |
| 8,132,467 B2 * | 3/2012 | Shinde | G01N 3/56 |
| | | | 73/774 |
| 8,894,918 B2 | 11/2014 | Dicarlo et al. | |
| 9,250,148 B2 | 2/2016 | Manohara et al. | |
| 10,161,807 B2 * | 12/2018 | Shi | G01K 7/028 |
| 2004/0080394 A1 | 4/2004 | Nelson | |
| 2004/0157338 A1 | 8/2004 | Burke et al. | |
| 2004/0202886 A1 | 10/2004 | Subramanian | |
| 2005/0115329 A1 | 6/2005 | Gregory et al. | |
| 2005/0147877 A1 * | 7/2005 | Tarnowski | H01M 2/0207 |
| | | | 429/162 |
| 2005/0198967 A1 * | 9/2005 | Subramanian | C23C 4/18 |
| | | | 60/803 |
| 2006/0288794 A1 | 12/2006 | Hardwicke et al. | |
| 2007/0029303 A1 * | 2/2007 | Bowen | G01K 7/02 |
| | | | 219/270 |
| 2007/0056624 A1 | 3/2007 | Gregory et al. | |
| 2008/0025366 A1 | 1/2008 | McBurney | |
| 2008/0223504 A1 | 9/2008 | Ohno | |
| 2008/0230904 A1 * | 9/2008 | Lee | H01L 21/28575 |
| | | | 257/751 |
| 2008/0264175 A1 | 10/2008 | Leman et al. | |
| 2009/0039911 A1 | 2/2009 | Dang | |
| 2009/0078561 A1 * | 3/2009 | Teo | B82Y 15/00 |
| | | | 204/173 |
| 2009/0121896 A1 | 5/2009 | Mitchell | |
| 2009/0290614 A1 | 11/2009 | Gregory et al. | |
| 2010/0109209 A1 * | 5/2010 | Pasquero | C04B 35/117 |
| | | | 264/640 |
| 2010/0117859 A1 * | 5/2010 | Mitchell | F01D 17/02 |
| | | | 340/870.16 |
| 2010/0226756 A1 * | 9/2010 | Mitchell | F01D 5/288 |
| | | | 415/118 |
| 2010/0319436 A1 * | 12/2010 | Sun | A61B 5/01 |
| | | | 73/61.46 |
| 2011/0222582 A1 | 9/2011 | Subramanian et al. | |
| 2011/0280279 A1 | 11/2011 | Gregory et al. | |
| 2011/0299562 A1 | 12/2011 | Hashemian | |
| 2013/0020670 A1 | 1/2013 | Hori et al. | |
| 2013/0125386 A1 | 5/2013 | Gregory et al. | |
| 2013/0298648 A1 * | 11/2013 | Sun | A61B 5/14532 |
| | | | 73/61.76 |
| 2014/0058166 A1 * | 2/2014 | Bedard | B01J 3/008 |
| | | | 585/539 |
| 2014/0083848 A1 | 3/2014 | Sun et al. | |
| 2014/0346502 A1 * | 11/2014 | Matsukizono | H01L 29/7869 |
| | | | 257/43 |
| 2015/0364667 A1 * | 12/2015 | Jarmon | H01L 35/30 |
| | | | 136/208 |
| 2016/0153842 A1 | 6/2016 | Cheverton et al. | |
| 2016/0169749 A1 * | 6/2016 | Glasheen | G01K 1/08 |
| | | | 374/179 |
| 2016/0305271 A1 | 10/2016 | Schmidt et al. | |
| 2017/0008125 A1 * | 1/2017 | Bruck | G01K 1/08 |
| 2017/0373612 A1 | 12/2017 | Sellinger et al. | |

OTHER PUBLICATIONS

Ahmed, et al., "Comparison of Argon Triple Point between NIS-Egypt and LNE-INM/CNAM/France", Journal of Metrology Society of India, vol. 23, No. 1, 2008, 3-9.

Aniolek, et al., "Thin film thermocouples for advanced ceramic gas turbine engines", Surface and Coatings Technology, vol. 28/29, Elsevier Science, S.A., 1994, 70-75.

Chaston, "The Oxidation of the Platinum Metals", Platinum Metals Review, vol. 19, No. 4, 1975, 135-140.

Chou, "Anomalous solid state reaction between SiC and Pt", J. Mater. Res., vol. 5, No. 3, Materials Research Society, Mar. 1990, 601-608.

Chou, "High temperature reactions between SiC and platinum", Journal of Materials Science, vol. 26, 1991, 1412-1420.

Gegner, et al., "Diffusivity and solubility of oxygen in solid palladium", J Mater Sci, vol. 44, Springer Science+Business Media, LLC, 2009, 2198-2205.

Kreider, et al., "High temperature materials for thin-film thermocouples on silicon wafers", This Sold Films, vol. 376, Elsevier Science S.A., 2000, 32-37.

Naslain, "SiC-Matrix Composites: Nonbrittle Ceramics for Thermo-Structural Application", International Journal of Applied Ceramic Technology, vol. 2, No. 2, 2005, 75-84.

Rijinders, et al., "Pattern formation in Pt—SiC diffusion couples", Solid State Ionics, vol. 95, Elsevier Science B.V., 1997, 51-59.

Tougas, "Metallic and Ceramic Thin Film Thermocouples", Open Access Master's Theses, Paper 7, http://digitalcommons.uri.edu/theses/7, 2013.

Tougas, et al., "Metallic and Cermic Thin Film Thermocouples for Gas Turbine Engines", Sensors, vol. 13, Nov. 8, 2013, 15324-15347.

Tougas, et al., "Thin film platinum-palladium thermocouples for gas turbine engine application", Thin Solid Films, vol. 539, Elsevier B.V., 2013, 345-349.

Wrbanek, et al., "Ceramic thin film thermocouples for SiC-based ceramic matrix composites", Thin Solid Films, doi:10.1016/j.tsf. 2012.04.034, 2012.

Yu, et al., "NiAl bond coats made by a directed vapor deposition approach", Materials Science and Engineering A, vol. 394, Elsevier B.V., 2005, 43-52.

Smith, et al., "Electrical Resistance as a Nondestructive Evaluation Technique for SiC/SiC Ceramic Matrix Composites Under Creep-Rupture Loading", International Journal of Applied Ceramic Technology, vol. 8, No. 2, The American Ceramic Society, 2011, 298-307.

Chen, Ximing, et al., "Thin-Film Thermocouples Based onthe System In2O3—SnO2", J. Am. Ceram. So., vol. 94, No. 3, The American Ceramic Society, 2011, 854-860.

Imran, Muhammad, et al., "Effect of Thin Film Thicknesses and Materials on Response of RTDs and Microthermocouples", IEEE Sensors Journal, vol. 6, No. 6, IEEE, Dec. 2006, 1459-1467.

Rivera, Kevin, et al., "Advanced Sensors for CMC Gas Turbine Engine Components", ICACC 2017 Proceedings, May 31, 2018, 1-4.

Rivera, Kevin, et al., "Diffusion barrier coatings for CMC thermocouples", Surface & Coatings Technology, vol. 336, Elsevier B.V., Feb. 25, 2018, 17-21.

Rivera, K., et al., "Embedded Thermocouples for CMC Engine Components", IEEE Sensors, 2017.

Rivera, Kevin, et al., "Novel temperature sensors for CMC engine components", Journal of Materials Research, vol. 32, No. 17, Materials Research Society, Sep. 14, 2017, 3319-3325.

Rivera, Kevin, et al., "Strain Gages for SIC-CiC Ceramic Matrix Composite Engine Components", IEEE Sensors Letters, vol. 2, No. 3, IEEE, Sep. 2018.

(56) References Cited

OTHER PUBLICATIONS

Wang, C. C., et al., "High-Temperature thermistors based on yttria and calcium zirconate", Sensors and Actuators A, vol. 58, Elsevier Science S.A., 1997, 237-243.

Zhang, Jingchun, et al., "Electrical, mechanical and metal contact properties of polycrystalline 3C—SiC films for MEMS in harsh environments", Surface & Coatings Technology, vol. 201, Elsevier B.V., 2007, 8893-8898.

* cited by examiner

FIG. 1: Schematic of imbedded thin film thermocouples for CMCs

FIG. 2: Schematic of surface temperature and thermal gradient sensors for CMCs

FIG. 3: Thermoelectric response of a thick film version of the surface temperature (STS) and thermal gradient sensor (TGS) formed on a SiC-SiC CMC (first thermal cycle).

FIG. 4: Thermoelectric response of a thick film version of the surface temperature (STS) and thermal gradient sensor (TGS) formed on a SiC-SiC CMC (second thermal cycle).

FIG. 5: Hysteresis of thermoelectric response as a function of the temperature difference between the hot and cold junctions (cycle 1).

FIG. 6: Hysteresis of thermoelectric response as a function of the temperature difference between the hot and cold junctions (cycle 2).

FIG. 7: Thermoelectric response of a thick film version of the surface temperature (STS) and thermal gradient sensor (TGS) formed on a SiC-SiC CMC (ref. room temperature)

FIG. 8: Hysteresis of thermoelectric response as a function of the temperature difference between the hot and cold junctions (cycle 1).

FIG. 9: Hysteresis of thermoelectric response as a function of the temperature difference between the hot and cold junctions (cycle 2).

FIG. 10: Thermoelectric response of an STS thermocouple and a Pt:Pd thin film thermocouple.

FIG. 11: Thermoelectric response of a STS thermocouple fabricated with the SiC fibers (weave) oriented along the length of a CMC substrate.

FIG. 12: Thermoelectric response of a STS thermocouple fabricated with the SiC fibers (weave) oriented perpendicular to the long axis of a CMC substrate.

FIG. 13: Thermoelectric response of a STS thermocouple fabricated with the SiC fibers (weave) oriented at a 45° angle with respect to the long axis of the CMC substrate.

FIG. 14: Cross section of the surface temperature sensor utilizing an oxygen diffusion barrier and a diffusion barrier to prevent platinum silicide formation.

TEMPERATURE AND THERMAL GRADIENT SENSOR FOR CERAMIC MATRIX COMPOSITES AND METHODS OF PREPARATION THEREOF

This application claims priority to U.S. Patent Application Ser. No. 62/294,851, filed Feb. 12, 2016 and U.S. Patent Application Ser. No. 62/348,543 filed on Jun. 10, 2016, and incorporates the same herein in their entirety by this reference.

BACKGROUND OF THE INVENTION

The use of ceramic-based materials, such as SiC—SiC and C—C based ceramic matrix composites (CMC) in the hot sections of gas turbine engines has emerged as an alternative to super alloy-based engine components. However, this has prompted the need for a high-resolution surface temperature measurement (STS) as well as a local thermal gradient measurement (TGS). The present invention relates to the use of a device that can be applied to the surface of CMCs in such a way that the CMC itself will contribute to the extraordinarily large thermoelectric power.

BRIEF SUMMARY OF THE INVENTION

The present invention relates to the use of either thin or thick film technology. For instance, one aspect of the present invention relates to a device that can be applied to the surface of CMCs in such a way that the CMC itself will contribute to the extraordinarily large thermoelectric power. In at least one embodiment, the thermoelectric power of a Pt:Pd thin film thermocouple is approximately 10 µV/° C., whereas a Pt:SiC thermocouple exhibits a thermoelectric power of at least 180 µV/° C., depending on the impurity levels in the semiconductor. This represents more than an order of magnitude greater power than the Pt:Pd thermocouple achieves. Further, this translates into a much higher resolution measurement, between 1 and 2 orders of magnitude improvement in resolution.

The present invention's approach for taking surface temperature measurement is ideally suited for very high temperature applications because it only requires a single metal thermoelement. In at least one embodiment, the thermoelement is platinum. This makes it possible for the thermocouples to be used at exceedingly high temperatures, as high as 1600° C., in view of the fact that platinum melts at 1768° C. Further, because this approach only requires a single metal thermoelement, it requires half of the processing steps typically required to make the Pt:Pd thin film thermocouples. This provides the added benefit of a more streamlined and simplified fabrication sequence.

The most commonly used thermocouple (Type K thermocouple) has a sensitivity of 41 µV/° C. and the thermoelectric power of a Pt:Pd thin film thermocouple is only 10 µV/° C. Thus, the present invention provides resolution of temperature measurements that range from 1 to 2 orders of magnitude better than current thermocouples, such as Pt:Pd thin film thermocouples.

There are many advantages in thick film technology including at least the following benefits: (a) vacuum chamber is not required for fabrication process and thick film technology; (b) it can be applied to larger parts that cannot fit into the vacuum chamber a typical sputtering machine and the lithography steps can be omitted if small line-widths and spaces are not required; and (c) pastes, cements or thermal spraying can be used to deposit the metal and dielectric layers. For instance, platinum lines and coatings of materials that insulate or planarize the surface can be applied using these techniques.

BRIEF DESCRIPTION OF THE FIGURES

FIG. 10 shows a large difference in slope, which is indicative of the large difference in thermoelectric response between the STS and the Pt:Pd thin film thermocouple.

DETAILED DESCRIPTION OF THE INVENTION

The present invention relates to the use of either thin or thick film technology. For instance, one aspect of the present invention relates to a device that can be applied to the surface of CMCs in such a way that the CMC itself will contribute to the extraordinarily large thermoelectric power. In at least one embodiment, the thermoelectric power of a Pt:Pd thin film thermocouple is approximately 10 µV/° C., whereas a Pt:SiC thermocouple exhibits a thermoelectric power of at least 180 µV/° C., depending on the impurity levels in the semiconductor. This represents more than an order of magnitude greater power than the Pt:Pd thermocouple achieves. Further, this translates into a much higher resolution measurement, between 1 and 2 orders of magnitude improvement in resolution.

Figure 1:
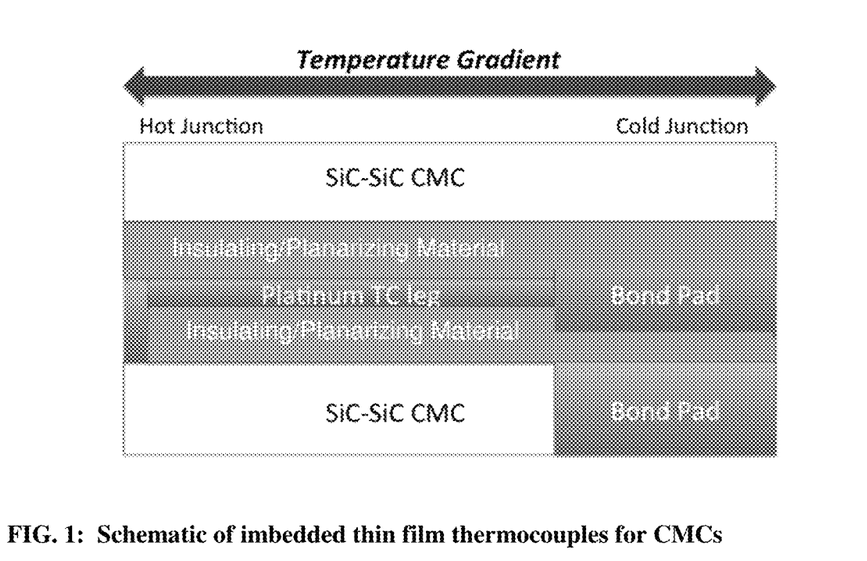
FIG. 1 is a schematic of imbedded thin film thermocouples for CMCs.

For example, SIC—SiC based CMCs are initially subjected to high temperatures in air to grow a high quality thermal oxide (SiO2) on the surface of the CMC. This oxide forms an electrical insulator to isolate the thin film sensors from the substrate. A coating or material that insulates and planarizes the surface can be applied to the surface and fired at high temperature. A person of ordinary skill would appreciate the various materials suitable for this application. The coating not only provides electrical isolation but also planarizes the CMC surface so they are compatible with thin film devices, since thin film sensors are deposited directly on the surface of the coated CMC via sputtering. The ability to instrument the CMC surfaces is strongly dependent on thermally grown SiO2 layer in combination with an insulating and planarizing coating and the adhesion of platinum thermocouple legs to the SiC—SiC CMC. A schematic (top view) of the thin thermocouple embodiment of this invention on a CMC is shown in FIG. 1.

Figure 2:
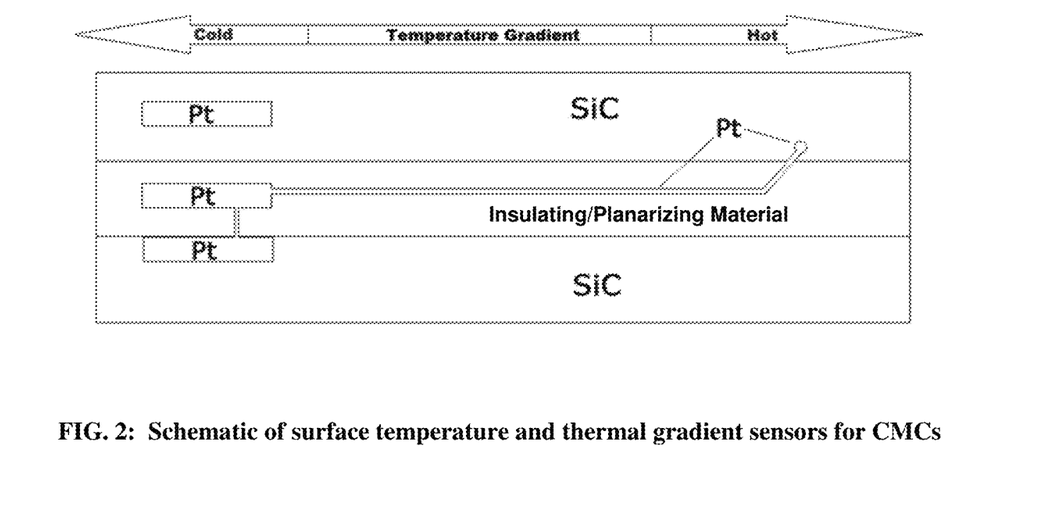
FIG. 2 is a schematic of surface temperature and thermal gradient sensors for CMCs.

Another aspect of the present invention relates to a measuring local thermal gradients, when large thermal gradients are imposed on the surface of a component. For instance, one application includes measuring gradients on the surface of a gas turbine engine blade where large gradients are typically encountered. With respect to this additional embodiment of the present invention, the thermal gradient incorporates all the same components as the device for high-resolution surface temperature measurement, but further comprises an additional wire. In at least one embodiment, the thin film in the cold junction on the coating, which insulates and planarizes the surface, is directly connected to an additional thin film bond pad on the SiC which is located at the cold junction to allow for the measurement of a second temperature (lower temperature) and thus enable the measurement of a local temperature gradient across the surface. In other words, the temperatures of the hot and cold junctions are measured simultaneously which allows for the temperature gradient to be determined. In at least one embodiment of the present invention, the only deposited metal is platinum and the SiC—SiC CMC is used again as the other thermoelement. This provides an added benefit of a streamlined fabrication process. A schematic of the thermal gradient sensor (TGS) for CMCs is shown in FIG. 2.

The thermal gradients are determined from the temperature measurement at two locations: the hot and cold junctions of the STS. As described herein, the thermal gradient can be determined at any specific location independent of the magnitude of the ΔT.

Figure 10:
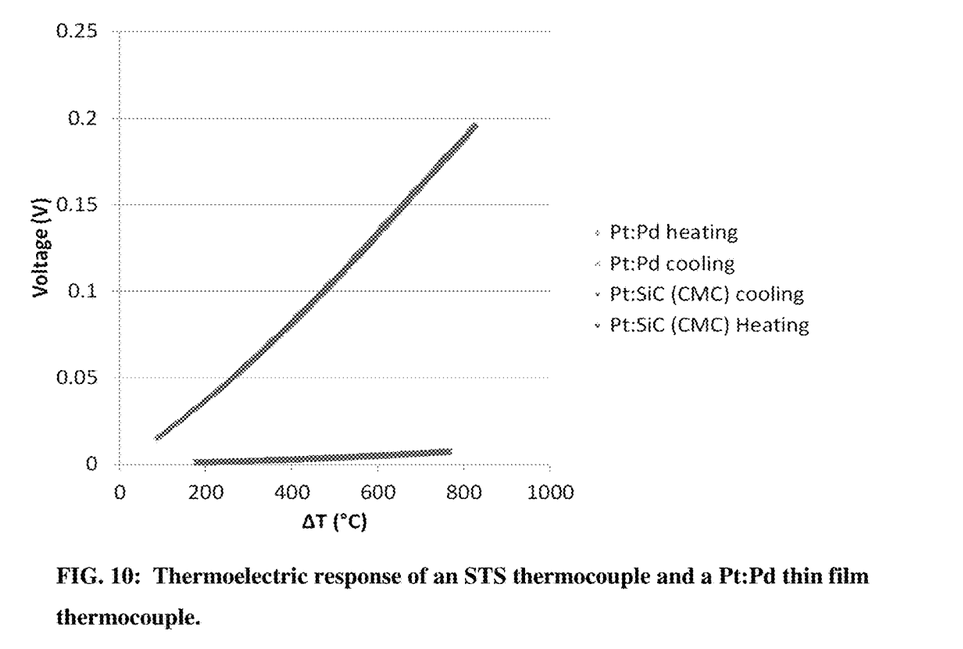
FIG. 10 depicts the thermoelectric response of an STS thermocouple and a Pt:Pd thin film thermocouple.

The present invention's approach for taking surface temperature measurement is ideally suited for very high temperature applications because it only requires a single metal thermoelement. In at least one embodiment, the thermoelement is platinum. This makes it possible for the thermocouples to be used at exceedingly high temperatures, as high as 1600° C., in view of the fact that platinum melts at 1768° C. Further, because this approach only requires a single metal thermoelement, it requires half of the processing steps typically required to make the Pt:Pd thin film thermocouples. This provides the added benefit of a more streamlined and simplified fabrication sequence. FIG. 10 compares the two types of thermocouples is much larger.

Another aspect of the present invention involves the process of designing and producing a thermal gradient sensor that employs only one metal, and the capability to fabricate these sensors using thick film technology. For instance, platinum ink or paste, or even thermal spraying can be used to form the platinum legs or thermoelements. One advantage of this process is that it eliminates the need for sputtering and the necessity for a high vacuum chamber. Thus, the fabrication of thermocouples can be facilitated on very large parts that would not otherwise fit into a typical sputtering machine. Another advantage of using thick film technology to fabricate the STS and TGS is the ability to quickly and easily repair the sensor regardless of how the original sensor was fabricated; i.e. whether the STS or TGS was fabricated using thin or thick film technology it can be repaired using thick film technology.

In at least one embodiment the thermal gradient sensor will be a true surface temperature measurement due to the implication of CMC as one of the thermoelectric materials. At least one embodiment uses the SiC as a component of the thermocouple. This permits a true surface temperature measurement that can be made on any CMC part used in any application.

According to various embodiments, the present invention can be implemented onto CMC parts using either thin film technology or thick film technology incorporating pastes, cements or thermal sprayed metals and dielectric coatings.

According to at least one embodiment, the devices comprises four wires, which allows for simultaneous measurement of thermal gradient and two surface temperatures at a single location. Due to fewer wires to measure to temperature (4 wires for every 3 measurements) more temperature data can be recorded with the use of fewer wires and connections or welded joins to wires.

Figure 11:
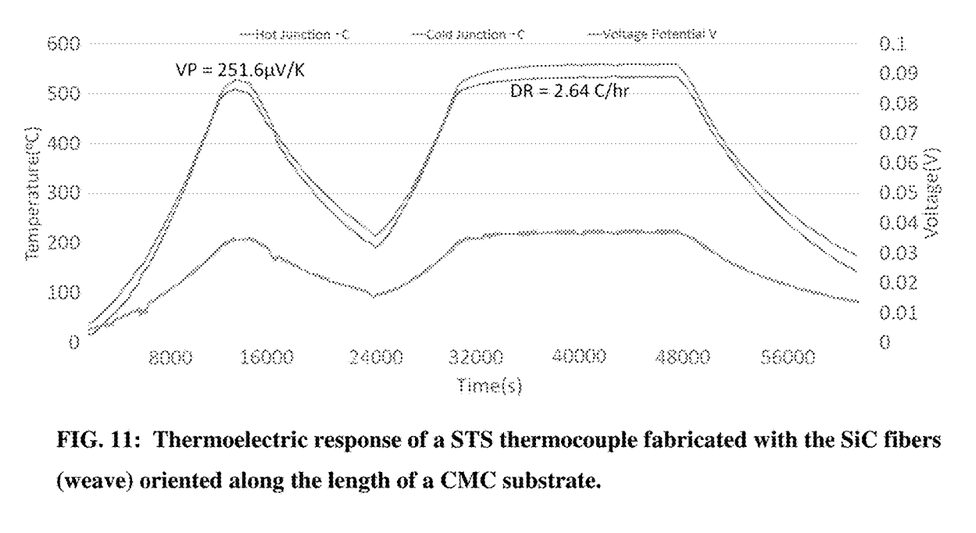
FIG. 11 depicts the thermoelectric response of a STS thermocouple fabricated with the SiC fibers (weave) oriented along the length of a CMC substrate.
Figure 12:
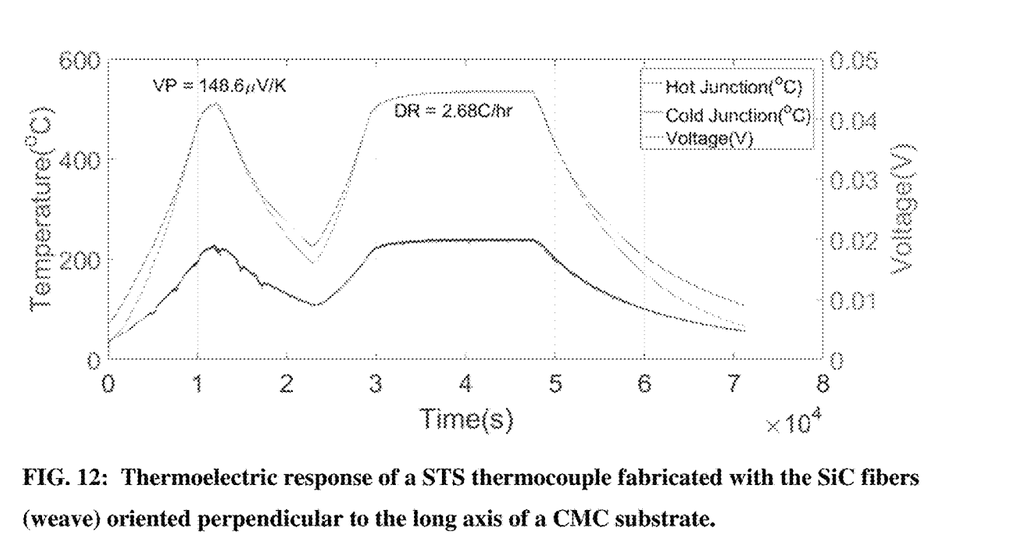
FIG. 12 depicts the thermoelectric response of a STS thermocouple fabricated with the SiC fibers (weave) oriented perpendicular to the long axis of a CMC substrate.
Figure 13:
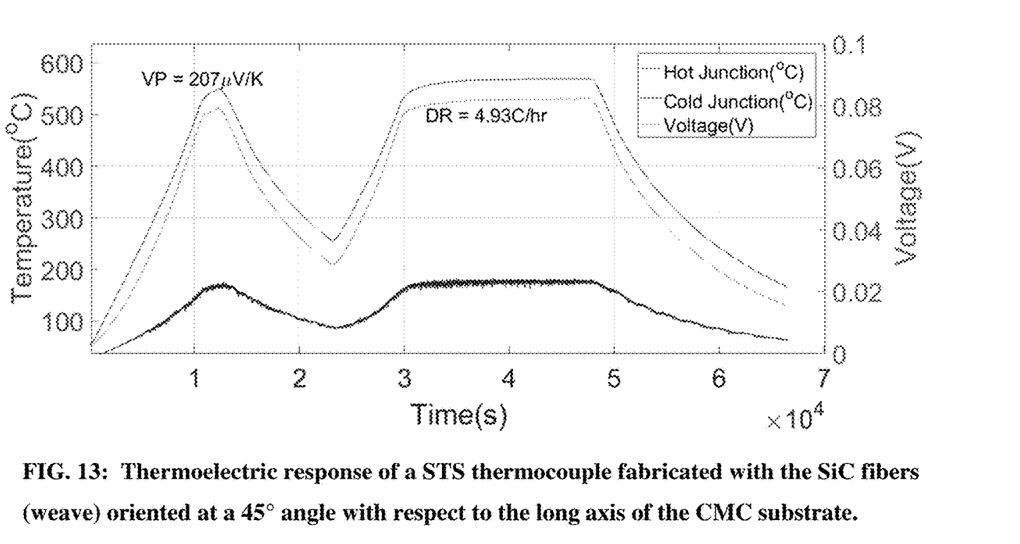
FIG. 13 depicts thermoelectric response of a STS thermocouple fabricated with the SiC fibers (weave) oriented at a 45° angle with respect to the long axis of the CMC substrate.

According to various embodiments, the use of different SiC fiber orientations (or weave orientation) in the CMC does effect thermoelectric response. The CMC substrates with SiC fibers oriented along the length of the substrate (FIG. 11), provided the largest thermoelectric response and those CMC substrates with SiC fibers oriented perpendicular to the substrate provide the smallest thermoelectric response (FIG. 12). The CMC substrates with SiC fibers oriented at a 45° angle with respect to the long axis of the substrate provided a thermoelectric response between that of the horizontal and vertical SiC fiber orientations (FIG. 13). The CMC substrate with a SiC fiber along the length of the substrate produced a maximum thermoelectric output of 251 µV/K., while the CMC substrate with a horizontal SiC fiber weave produced a thermoelectric voltage of 148 µV/K, and the CMC substrate with SiC fibers at a 45° angle relative to length of the substrate produces a thermoelectric output of 207 µV/K.

Figure 14:
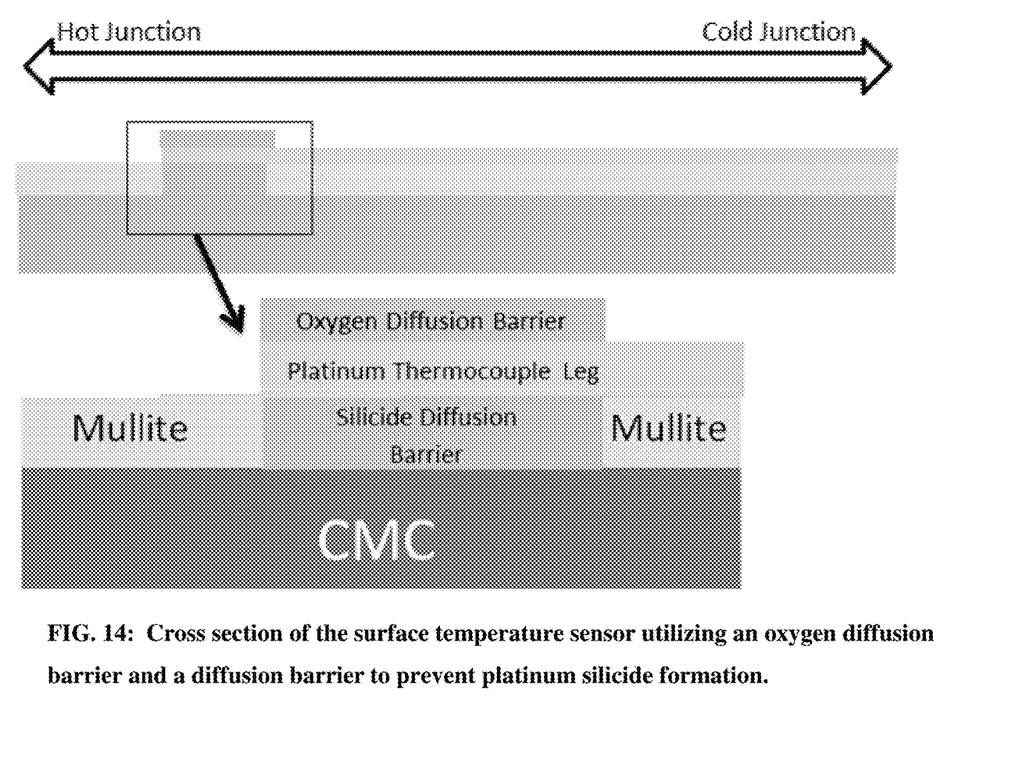
FIG. 14 depicts cross section of the surface temperature sensor utilizing an oxygen diffusion barrier and a diffusion barrier to prevent platinum silicide formation.

In various embodiments, the use of a diffusion barrier is used to maintain the ohmic contact between the platinum thermoelement and the SiC thermoelement (substrate) to prevent the formation of platinum silicides, which can quickly degrade the performance of the device, especially at temperatures above 1000° C. In at least one embodiment, a tungsten:ITO nanocomposite is used as a diffusion barrier to prevent platinum silicide formation. In another embodiment, a diffusion barrier is used to prevent the diffusion of oxygen through the platinum and oxidize the SiC at the platinum silicon carbide interface, forming silicon dioxide and forming a rectifying contact instead of ohmic contact. InON and ITON films can prevent the diffusion of oxygen through the platinum at high temperature (for instance, greater than 1000° C.). Thus, the use of diffusion barriers serve to as make it possible for the STS and TGS to operate at temperatures above 1000° C. In a further embodiment, the use of two diffusion barrier coatings are used to protect against the formation of platinum silicides as well as prevent the diffusion of oxygen to the SiC substrate where it can form silicon dioxide ands render the device useless. For instance, the diffusion barrier coating used to prevent platinum silicides from forming is either ITO, ITO:W or In:W and the diffusion barrier used to prevent oxygen form reaching the platinum thermoelement is either InON or ITON. This embodiment serves as a high temperature sensor as it is able to operate at temperatures above 1000° C. By way of example, FIG. 14 depicts at least one embodiment of the use of diffusion barriers to enable operation of the STS and TGS at temperatures above 1000° C.

For instance, according to Formula I:

$$\lim_{x \to 0} \frac{dt}{dx}$$

ΔT can still be measured due to the small distances to establish gradients with this device; i.e. a temperature gradient can be determined at any specific location desired on a CMC part. ΔT can be very small in magnitude due to the large thermoelectric powers using this approach and the enhanced resolution associated with this approach.

Throughout this disclosure, various publications, patents and published patent specifications are referenced. Where permissible, the disclosures of these publications, patents and published patent specifications are hereby incorporated by reference in their entirety into the present disclosure to more fully describe the state of the art.

As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Before explaining the various embodiments of the disclosure, it is to be understood that the invention is not limited in its application to the details of construction and the arrangement of the components set forth in the following description. Other embodiments can be practiced or carried out in various ways. Also, it is to be understood that the phraseology and terminology employed herein is for the purpose of description and should not be regarded as limiting the inventions described in any way.

EXAMPLES

Example 1

The thermoelectric response of a thick film version of the surface temperature sensor (STS) and thermal gradient sensor (TGS) formed on a SiC—SiC CMC is shown in FIG. 3, FIG. 4, FIG. 5 and FIG. 6.

Figure 3:
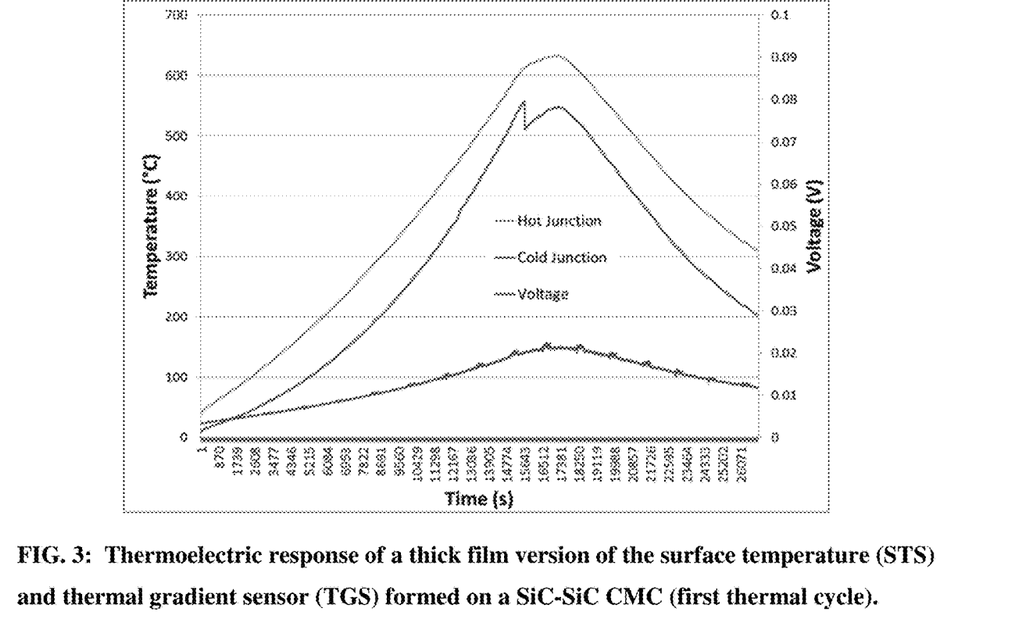
FIG. 3 depicts the thermoelectric response of a thick film version of the surface temperature (STS) and thermal gradient sensor (TGS) formed on a SiC—SiC CMC during the first thermal cycle.
Figure 4:
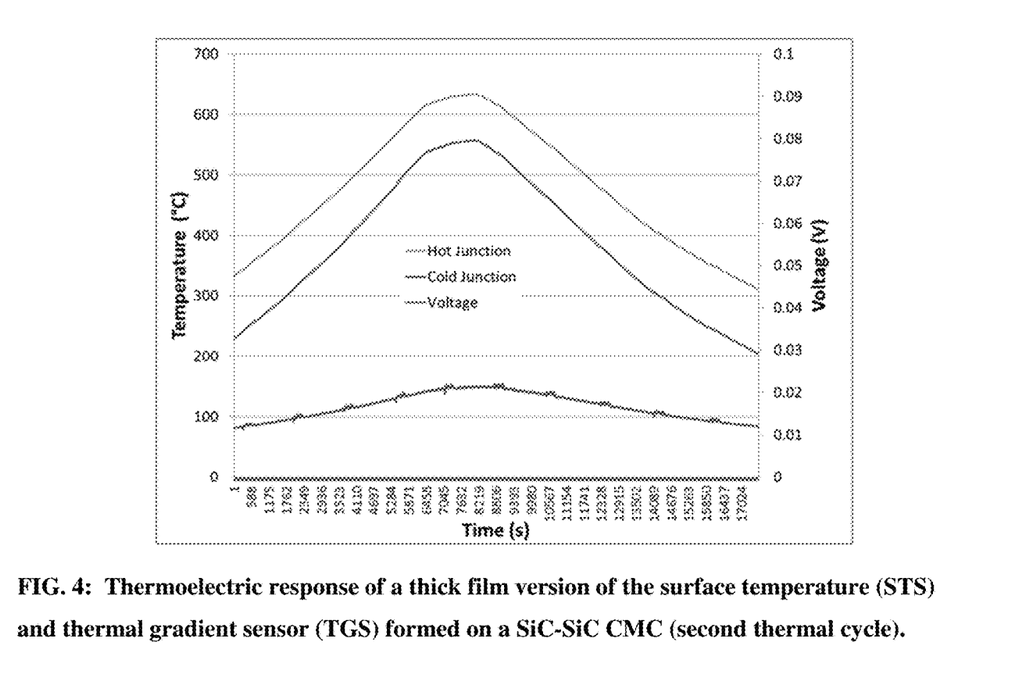
FIG. 4 depicts the thermoelectric response of a thick film version of the surface temperature (STS) and thermal gradient sensor (TGS) formed on a SiC—SiC CMC during the second thermal cycle.
Figure 5:
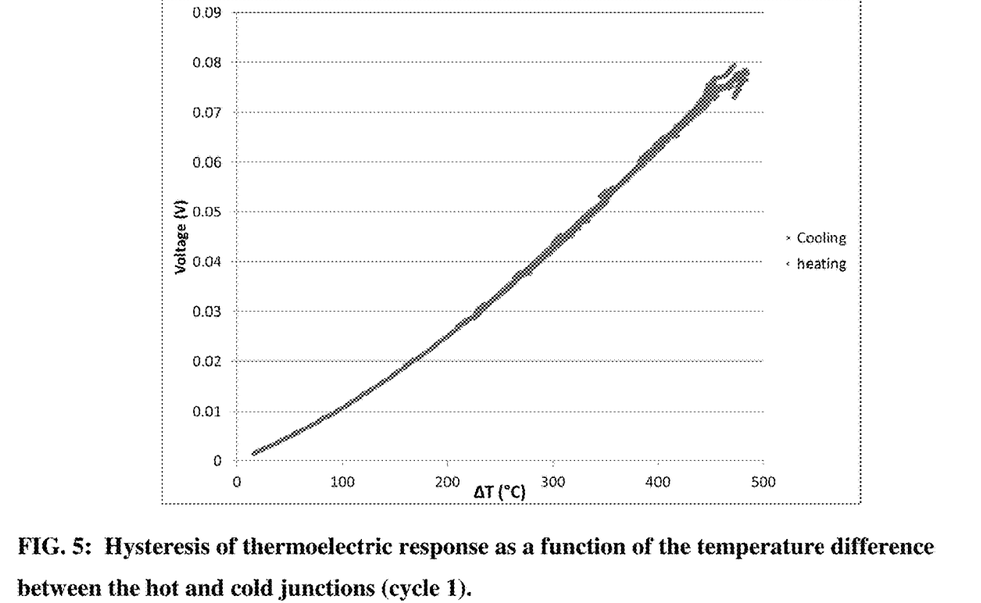
FIG. 5 depicts the time-based dependence of the thermoelectric response as a function of the temperature difference between the hot and cold junctions (cycle 1).
Figure 6:
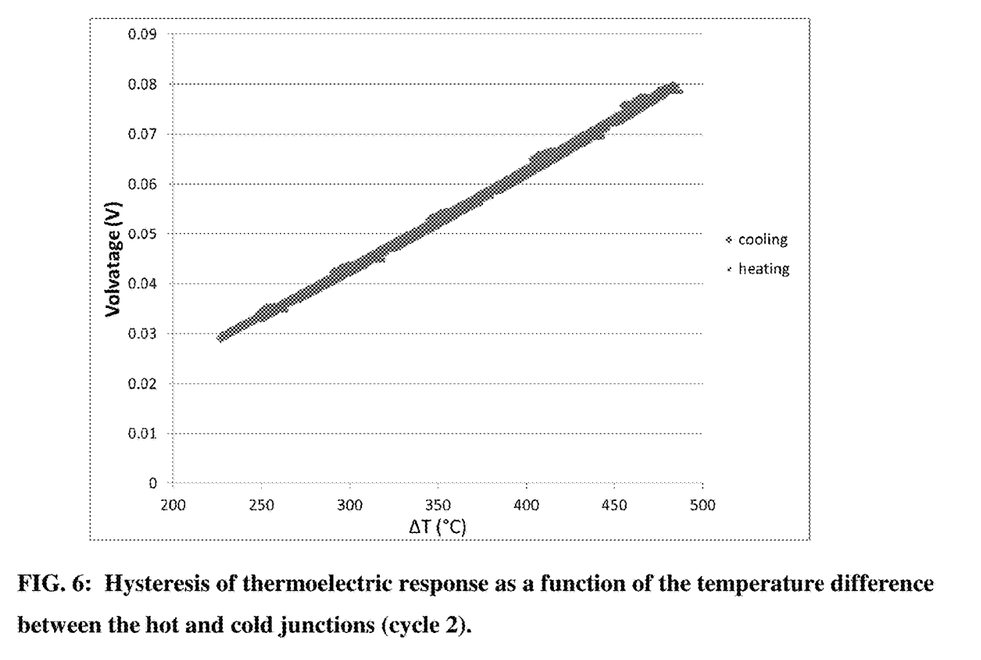
FIG. 6 depicts the time-based dependence of the thermoelectric response as a function of the temperature difference between the hot and cold junctions (cycle 2).

The peak thermoelectric voltages for a ΔT of 500° C. for each of the thermal cycles shown in FIGS. 3 and 4 is 95 mV, as compared to the thermoelectric voltage for a Pt:Pd thin film thermocouple of 7 mV for a ΔT of 500° C. This represented an increase of more than an order of magnitude in thermoelectric response for the inventive device.

Example 2

Figure 7:
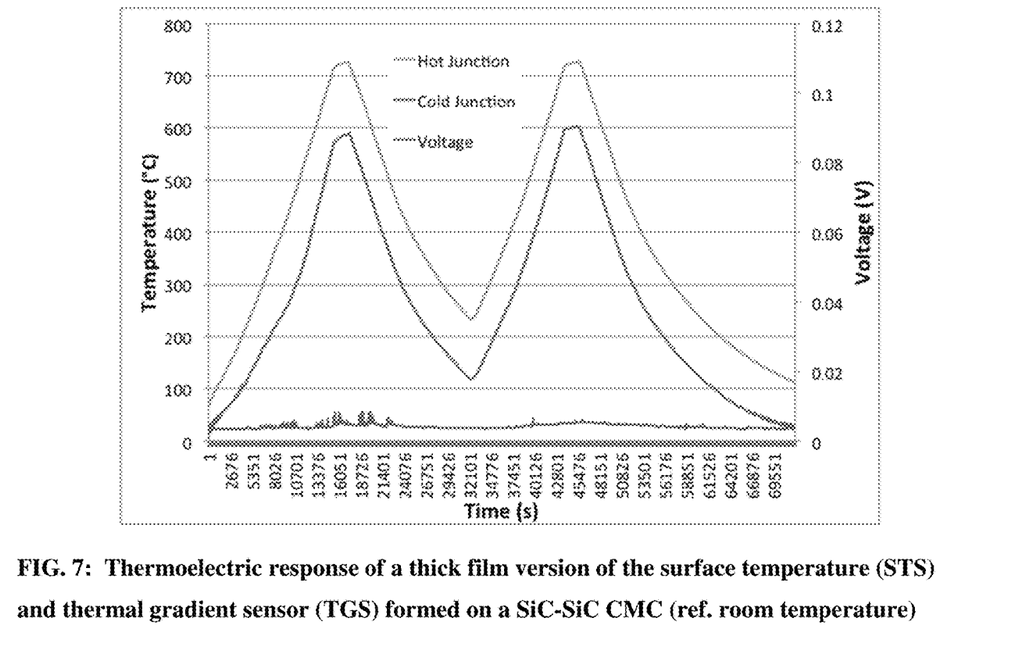
FIG. 7 depicts the thermoelectric response of a thick film version of the surface temperature (STS) and thermal gradient sensor (TGS) formed on a SiC—SiC CMC (ref. room temperature).
Figure 8:
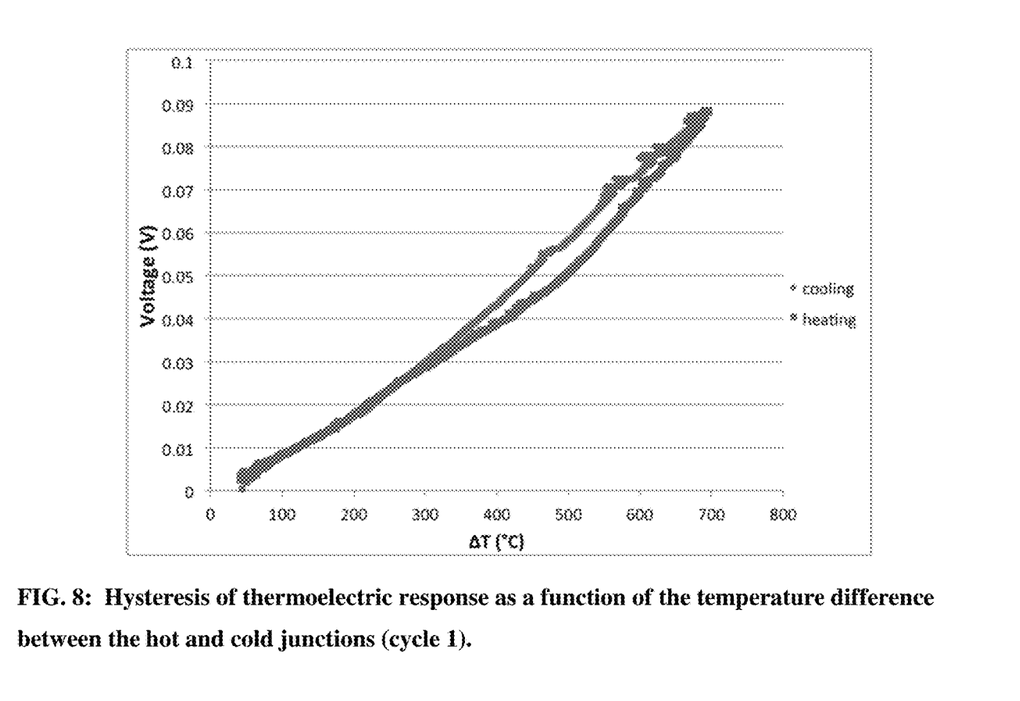
FIG. 8 depicts the time-based dependence of the thermoelectric response as a function of the temperature difference between the hot and cold junctions (cycle 1).
Figure 9:
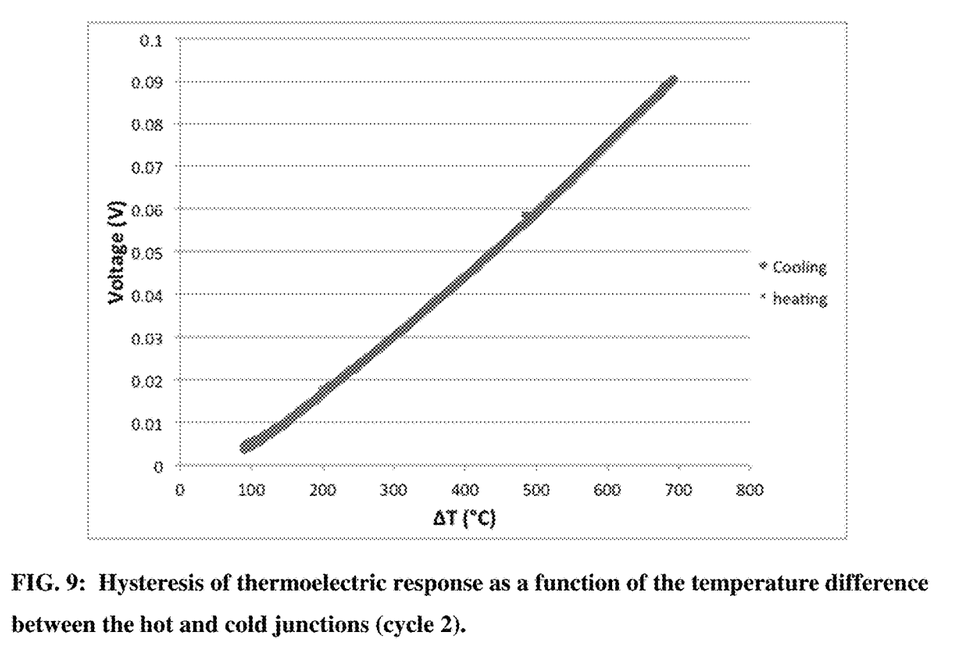
FIG. 9 depicts the time-based dependence of the thermoelectric response as a function of the temperature difference between the hot and cold junctions (cycle 2).

The thermoelectric response of a thick film version of the surface temperature (STS) and thermal gradient sensor (TGS) formed on a SiC—SiC CMC with a room temperature reference is shown in FIGS. 7, 8 and 9. As depicted, the peak thermoelectric voltage for a ΔT of 750° C. for the thermal cycles shown in FIG. 7 is 105 mV as compared to the thermoelectric voltage for a Pt:Pd thin film thermocouple of 9 mV for a ΔT of 750° C.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

What is claimed is:

1. A thermocouple comprising:
   a ceramic matrix composite (CMC) engine component;
   a layer of an electrically insulating material deposited on a surface of said CMC engine component;
   a electrically conductive material deposited on said layer of electrically insulating material except for a portion of said electrically conductive material which forms a point of contact with said CMC engine component;
   wherein said CMC engine component and said electrically conductive material are two thermoelements of the thermocouple and said portion of said electrically conductive material forms a thermocouple junction with said CMC engine component at said point of contact.

2. The thermocouple of claim 1, wherein said layer of electrically insulating material and said electrically conductive material comprise thin films.

3. The thermocouple of claim 1 wherein said layer of electrically insulating material and the electrically conductive material comprise thick films.

4. The thermocouple of claim 1 comprising four wires for taking a simultaneous measurement of a thermal gradient and two surface temperatures.

5. The thermocouple of claim 1 wherein said CMC engine component comprises SiC—SiC or C—C.

6. The thermocouple of claim 1 comprising only materials capable of withstanding temperatures over 1000° C.

7. The thermocouple of claim 6 comprising only materials capable of withstanding temperatures over 1600° C.

8. The thermocouple of claim 1 wherein the use of said CMC engine component as a thermoelement enables the thermocouple to produce a thermoelectric power of at least 180 μV/° C.

9. The thermocouple of claim 1 wherein the use of said CMC engine component as a thermoelement enables the thermocouple to produce a temperature measurement having a resolution that is from 1 to 2 orders of magnitude better than a temperature measurement resolution obtained from any Pt:Pd thin film thermocouple.

10. The thermocouple of claim 1 wherein said electrically conductive material comprises a single elemental metal.

11. The thermocouple of claim 10 wherein said metal is platinum.

12. The thermocouple of claim 10 wherein said electrically insulating material is a dielectric material and/or forms a planarizing layer.

13. The thermocouple of claim 1 wherein said electrically insulating material and said electrically conductive material are each deposited as a paste, ink, spray, or cement.

14. The thermocouple of claim 1 wherein said electrically insulating material and said electrically conductive material are each deposited without the use of a vacuum chamber.

15. The thermocouple of claim 1 wherein damage to said electrically insulating material or said electrically conductive material is reparable by depositing paste, ink, spray, or cement in situ.

16. The thermocouple of claim 1 wherein at least one of said electrically insulating material and said electrically conductive material is deposited and patterned using sputtering and/or lithography.

17. The thermocouple of claim 1 wherein said electrically insulating material comprises mullite.

18. The thermocouple of claim 1 comprising a silicide diffusion barrier deposited between said electrically conductive material and said CMC engine component under said portion of said electrically conductive material.

19. The thermocouple of claim 18 wherein said silicide diffusion barrier comprises a material selected from the group consisting of indium tin oxide (ITO), a tungsten:ITO nanocomposite, ITO:W, and In:W.

20. The thermocouple of claim 1 comprising an oxygen diffusion barrier deposited on said electrically conductive material.

21. The thermocouple of claim 20 wherein said oxygen diffusion barrier comprises indium oxynitride (InON) or indium tin oxynitride (ITON).

22. The thermocouple of claim 1 wherein a magnitude of thermoelectric power produced by the thermocouple depends on a fiber orientation of said CMC engine component.

* * * * *